Patented Feb. 11, 1947

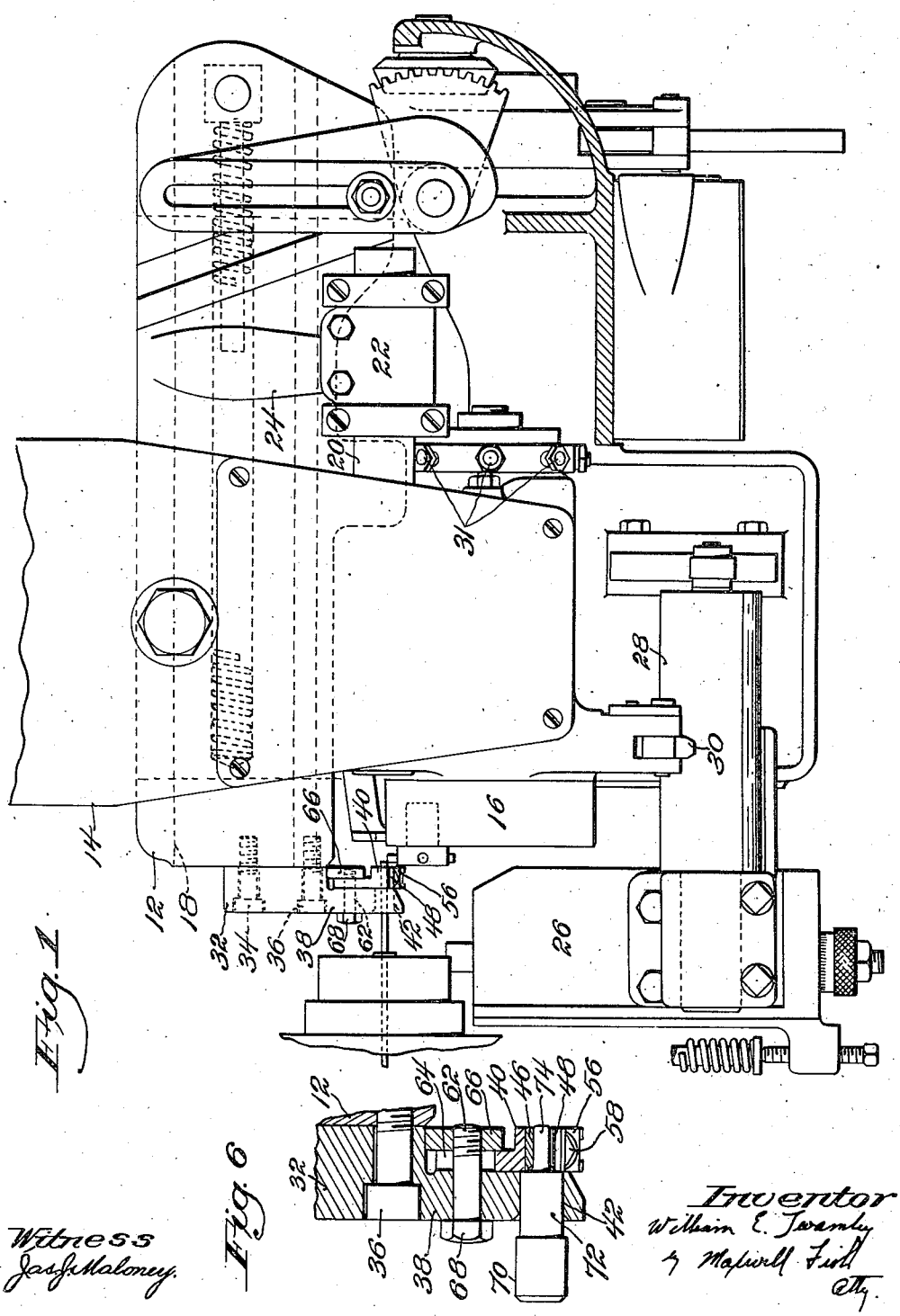

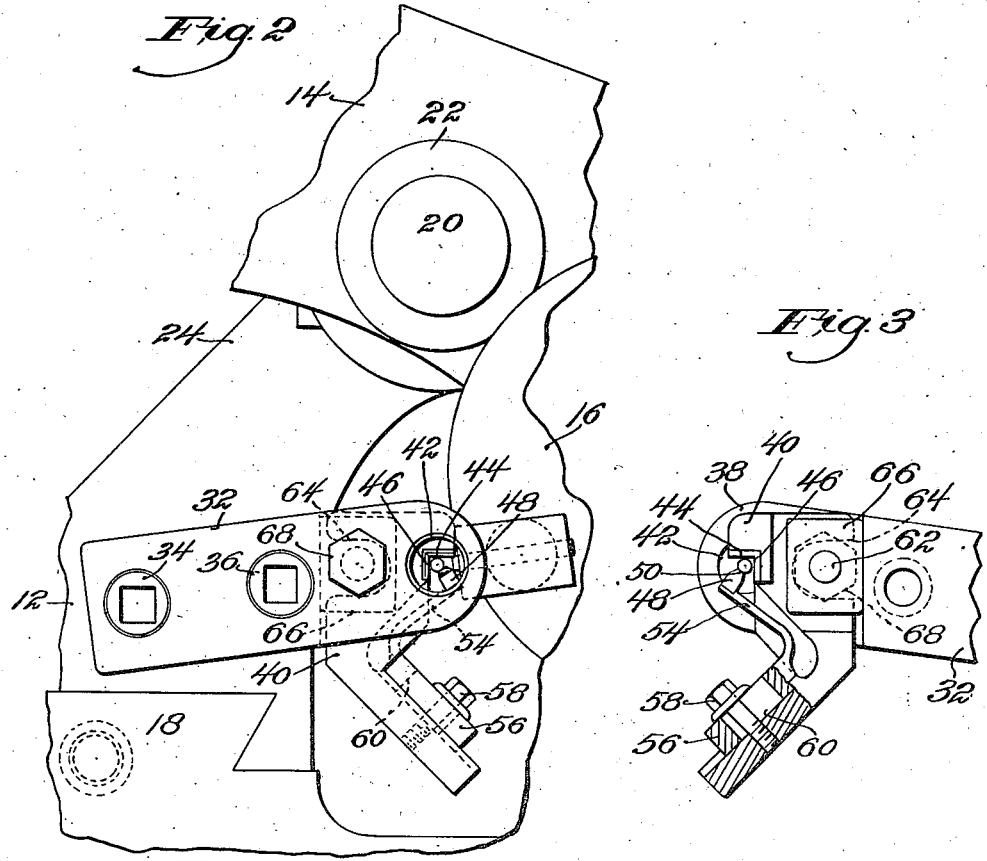

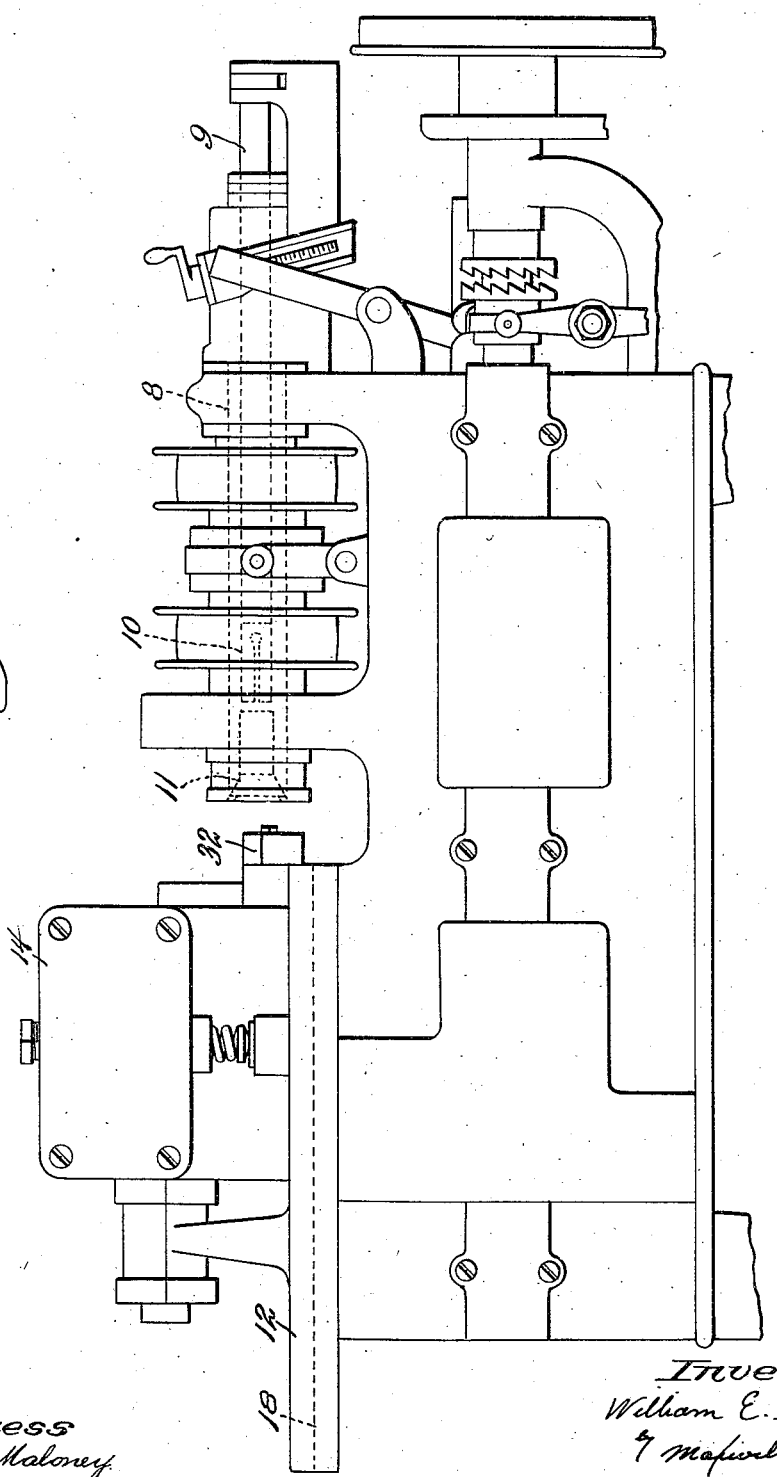

2,415,714

UNITED STATES PATENT OFFICE 2,415,714

BACK REST

William E. Twamley, Providence, R. I., assignor to Brown and Sharpe Manufacturing Company, a corporation of Rhode Island Application September 18, 1943, Serial No. 502,946

3 Claims. (Cl. 82—35)

The present invention relates to an improved back rest holder for the support of the feeding bar stock in automatic screw and similar machines.

The invention is herein disclosed as embodied in an automatic machine adapted for the performance of a series of single point turning operations upon small gauge stock in the manufacture of watch staffs and similar articles of relatively small size and precise dimensions. Machines of the general type referred to may consist of a work spindle assembly having means for rotating and for feeding the bar stock, and a tool supporting assembly to which the bar stock is fed having means for moving one or a plurality of tools against the rotating bar stock for the performance of the turning operation. The work spindle and more particularly the work engaging chuck provides support for the rotating bar stock against the thrust of the operating tools. It has been found, however, that as the gauge of the stock employed is decreased, additional support is required for the rotating bar stock to insure the desired degree of accuracy in the manufacture of the individual articles therefrom. In the manufacture of articles from small gauge stock, such support may be provided by means of a back rest supported a fixed distance from the operating tool axially of the rotating bar stock, and having formed therein an aperture through which the stock is projected. A back rest of this description has the disadvantage that clearance must be provided which is sufficient to insure the free movement of the bar stock through the back rest, and also to take care of imperfections such as unavoidable or undetected variations in diameter of the feeding bar stock. The amount of yield or spring thus permitted to the rotating bar stock, while small, is still sufficient to constitute a seriously limiting factor in adjusting the machine for operation within the extremely close limits demanded.

It is a principal object of the present invention to provide an improved back rest holder for the feeding bar stock in a machine of this general description which will serve to position the rotating bar stock with a substantially greater degree of accuracy adjacent the point of operation of the operating tool than has heretofore been considered feasible, and which is so constructed and arranged as to adjust itself automatically to variations in diameter or other imperfections which may appear in the feeding bar stock, and with a minimum loss of accuracy in the manufacture of the finished article.

It is a further object of the invention to provide a back rest holder of this general description which is readily adjustable for the support of bar stock of different sizes.

With these and other objects in view as may hereinafter appear, a principal feature of the invention consists in the provision of a back rest for the feeding bar stock which comprises a holder adjustable to bring the guiding surfaces of the holder into a contact position with relation to the feeding bar stock projected through the holder, in which the guiding surfaces are precisely located with relation to the work spindle assembly including the chuck, and with relation to each of the cutting tools as they are advanced into operating position, and a yieldable contact element cooperating with the guide surfaces to maintain the feeding bar stock in said engaging position.

Other features of the invention consist in certain details of construction and arrangement of the back rest which include the provision of a holder having two guiding contact surfaces set at right angles to one another, a spring actuated contact element supported integrally with the holder for engagement with the side of the rotating bar stock opposite from the guiding contact surfaces, and supporting means for the holder adapted to permit adjustment of the holder radially of the axis of rotation of the bar stock to be projected into engagement therewith.

The several features of the invention consist also in the devices, combinations and arrangement of parts hereinafter described and claimed, which together with the advantages to be obtained thereby, will be readily understood by one skilled in the art from the following description taken in connection with the accompanying drawings, in which:

Fig. 1 is a plan view of a portion of an automatic screw machine embodying in a preferred form the features of applicant's invention, only so much of the machine being shown as is necessary to illustrate the connection of the present invention therewith;

Fig. 2 is an enlarged view in elevation looking from the left, illustrating particularly the forward end of the slide, rocker support, turret and back rest shown in Fig. 1, but on a substantially larger scale;

Fig. 3 is an enlarged detail sectional view in right side elevation illustrating particularly the back rest including the yieldable engaging element and the supporting bracket therefor;

Fig. 4 is a still further enlarged detail of the back rest including the yieldable engaging element;

Fig. 5 is an enlarged detail view looking from the right of Fig. 4;

Fig. 6 is an enlarged detail view, partly in section, illustrating the use of the centering pin for adjusting the position of the back rest; and Fig. 7 is a view in rear side elevation of the machine.

The automatic machine illustrated in the drawings as embodying in a preferred form the several features of the invention, is substantially that shown in patent to Rich and Twamley, No. 2,345,686, dated April 4, 1944, for improvements in Screw and similar machines, which comprises a spindle assembly adapted for continuously rotating bar stock and for feeding successive portions of the same to the operating tools, a tool supporting and actuating assembly including a slide movable in a direction parallel to the rotational axis of the bar stock, a tool supporting turret mounting a number of single point turning tools, and a rocker support for the turret mounted on the slide for moving the turret and tools successively against the rotating bar from one side thereof. The illustrated machine is also provided with the usual driving and timing mechanisms common to these machines for positioning the work and for moving the tool slides and tools mounted thereon to perform the several fashioning operations upon each work piece and for feeding the work. In accordance with the usual practice in these machines, it is contemplated that all of the operations of rotating and feeding the work and for causing the several forming tools to perform their required functions for the fashioning of the several work pieces will be performed as part of a continuous and fully automatic operation.

The work spindle assembly of the machine is of ordinary construction as illustrated, for example, in the patent to Rich No. 1,877,693. The spindle assembly as indicated in Fig. 7 of the drawings, and as more particularly shown in the Rich patent referred to, comprises a hollow rotating spindle 8 in which a piece of metal bar stock is firmly held and rotated. A feed tube is indicated at 9 for feeding the bar stock through the spindle to present successive end portions to the tools, and has screwed to its inner end a feed collet 10 for gripping the bar of stock. A spring collet or chuck 11 is provided to clamp the bar rigidly with relation to the rotating spindle during the operations of the various tools in accordance with the usual practice in machines of this type.

The present invention is concerned particularly with the provision of an improved back rest adapted for providing additional support for bar stock which is supported to rotate and to be fed with relation to an operating tool assembly for the fashioning and cutting off of successive work pieces from the bar. While the invention is specifically disclosed as embodied in an automatic screw machine adapted for the manufacture of watch staffs by means of a series of single point turning operations, it will be understood that the invention is equally well adapted for use in other machines capable of performing this and similar operations.

The improved back rest which forms specifically the subject-matter of the invention, comprises a bracket supported for movement with the tool assembly axially of the rotating bar stock, and a holder adjustably supported thereon having a pair of contact surfaces at right angles to one another for engagement with the rotating bar at one side thereof, and a yieldable contact element for engagement with the opposite side of the rotating bar. The leading edges of the contact surfaces and of the contact element are bevelled to permit a bar loaded into the machine to be projected through the back rest into operating position. Adjustment of the holder is effected with the assistance of a centering plug or templet which is temporarily supported within the jaws of the spindle chuck for engagement with the bracket and holder to cause the contact faces of the holder to be located exactly with relation to the spindle assembly including the chuck, and with relation to the tool supporting assembly including the individual tools when advanced into operating relation to the bar. With the preferred construction and arrangement illustrated, the contact surfaces of the holder are engaged at all times with the rotating bar to support the bar at a point closely adjacent the point of operation, and with the greatest possible exactness against the thrust of the operating tool.

Referring specifically to the drawings, Fig. 1 discloses in plan portions of an automatic screw machine adapted for the turning of watch staffs. The work supporting assembly of the machine comprises a longitudinally movable slide 12, a rocker support 14 supported thereon, and a tool supporting turret 16 rotatably mounted on the rocker support 14 for transverse movements therewith toward and away from the work piece. The slide 12 is supported for movement in a direction parallel to the axis of rotation of the work piece on a guide 18 mounted on a fixed portion of the machine. The rocker support is carried on a pivot shaft 20 arranged to turn in a bearing 22 carried by an upwardly extending arm 24 on the slide 12. Rocking movement of the rocker support 14 is controlled by means of a cross slide 26 having mounted thereon a sloped face cam 28 which is engaged by a follower element 30. Inward movement of the slide 26 causes the rocker support 14 to be rocked counterclockwise on its supporting shaft 20 as viewed in Fig. 2, to move the turret 16 and tools thereon away from the work piece against the pressure of an actuating spring (not shown). Movement of the slide 26 outwardly causes the rocker support 14 to move clockwise (Fig. 2) to advance the turret 16 and tools toward the work. The extent of the advancing movement is determined by engagement of an adjustable stop 31 forming part of the turret assembly with a fixed stop surface on the slide 12. No further description or illustration of the work supporting assembly of the machine is believed necessary, since this mechanism so far described is substantially identical with that illustrated in the patent to Rich and Twamley, No. 2,345,686, above referred to.

The back rest provided in accordance with the present invention, comprises a bracket 32 which is adjustably supported on the leading end of the slide 12 by means of two clamping bolts 34, 36. In order to provide for a limited adjustment in the position of the bracket, oversize holes are provided in the bracket to receive the bolts 34, 36. A portion of the bracket at the outer end is slabbed off to form a recessed portion 38 to receive a holder 40. A hole 42 is formed in the bracket in line with the rotational axis of the work spindle assembly and bar stock mounted therein. The diameter of the hole 42 is substantially greater than that of the bar stock to be received in the machine. The holder 40 consists of a plate-like member having formed therein a pair of Carboloy inserts with contact surfaces 44, 46 set at a 90° angle with relation to one another, and having their leading edges adjacent the spindle assembly of the machine bevelled to engage with and direct the leading end of a bar projected therethrough into operating position. A downwardly extending tail of the holder 40 provides support for a flexible contact member 48 which comprises a block having a flattened bearing surface 50 for engagement with the bar stock, and a bevelled or cammed end surface 52 for springing the member 48 outwardly when a bar is projected through the back rest, a spring supporting arm 54 and a base portion 56. The yieldable contact member 48 is supported adjustably in position on the holder by means of a clamping screw 58 which passes through a slot 60 in the base 56 of the member, and is screw-threaded into the tail portion of the holder 40. The holder 40 is supported for both lateral and vertical adjustment within the recessed portion 38 of the bracket 32 by means of a clamping screw 62 which extends through a hole formed in the bracket and a cut-out 64 in the holder 40, and is screw-threaded into a large square nut 66. The holder 40 is clamped rigidly in position between the engaging face of the bracket and the nut 66. The bolt 62 is provided with a hexagonal head 68 for turning with relation to the nut 66 to tighten the clamp. The nut 66 is held against rotational movement by engagement of one edge thereof with the edge of the cut-away portion 38 of the bracket.

When the machine is set up for the performance of a particular operation, and before the bar stock to be operated upon is placed in the machine, a centering pin or templet 70 shown in Fig. 6, is located in the jaws of the chuck in order to properly locate the bracket 32 and holder 40. The pin comprises a stock which fits into the chuck in the usual manner, a portion 72 of large diameter which fits tightly with relation to the aperture 42 in the bracket, and a portion 74 of small diameter which is exactly equal to the diameter of the bar stock to be employed in the machine. When the clamping bolts 34, 36 for the bracket and the clamping bolt 62 for the holder 40 have been loosened, the centering pin is placed in position in the chuck, and the work supporting assembly including the slide 12 is moved forwardly to bring the aperture 42 and contact surfaces 44, 46 into engagement with the corresponding portions 72 and 74 of the centering pin. The clamping bolts are then tightened, the slide 12 is retracted, and the centering pin 70 is removed preparatory for starting the machine in operation. Adjustment of the tension of the spring finger 48 may be effected as follows: Before the parts are assembled, the operator takes the holder 40 in one hand and the center plug 70 in the other, and determines the tension by inserting the portion 74 between the fixed and movable work contacts.

With the construction and arrangement of the back rest above described, it will be readily appreciated that the accurate centering of the rotating bar by means of the contact surfaces 44, 46 of the holder 40 is dependent upon the use of bar stock which is of exactly measurable uniform diameter. The bar stock employed is ground or finished as nearly as possible to a predetermined uniform size. Thereafter and before each successive bar is placed in the machine, it may be subjected to a further rigid inspection, as by calipering to detect any variations in size or other imperfections.

The illustrated construction has the advantage that a solid support is provided for the rotating bar adjacent the operating tool without the necessity of providing clearance between the back rest and the bar, so that a maximum support is provided to maintain the rotating bar exactly in its centered position.

Another advantage of the improved construction consists in the construction and arrangement whereby the feeding bar may be continuously projected through the holder without risk that inadvertent increases in diameter or other imperfections may jam the machine or cause injury to the operating tools. In this connection, it may be noted that an inadvertent increase or decrease in diameter will cause the mathematical center of the bar to be moved away from the axis of rotation. While such imperfection may cause a particular article or articles to be imperfectly formed, the condition will be immediately corrected as the feeding bar returns to its normal diameter.

It will be understood that the invention is not limited to the specific embodiment shown, and that various deviations may be made therefrom without departing from the spirit and scope of the appended claims.

What is claimed is:

1. The combination with means for supporting and rotating a bar of stock on a fixed axis of rotation with an end extending outwardly including a feed type collet chuck, of a work rest for supporting the outward end of the stock comprising a support, two planar work engaging surfaces substantially meeting together to form an angle, said surfaces being fixedly and non-adjustably mounted in said support, means for rigidly mounting said support with the planar surfaces at a fixed distance from said axis of rotation the distance equal to exactly the radius of the bar stock, and yieldable means for pressing the bar stock against said surfaces.

2. The combination as set forth in claim 1, wherein the entrance edge of said yielding means is beveled to permit the projection of a bar through the work rest.

3. The combination as set forth in claim 1, wherein the entrance edges of both said surfaces and said yielding means are beveled to permit the projection of a bar through the work rest.

WILLIAM E. TWAMLEY.

REFERENCES CITED

The following references are of record in the file of this patent:

UNITED STATES PATENTS

| Number | Name | Date |
|---|---|---|
| 927,432 | Seward | July 6, 1909 |
| 819,439 | Koch | May 1, 1906 |
| 1,466,881 | Johnson | Sept. 4, 1923 |
| 697,854 | Landis | Apr. 15, 1902 |